W. E. SPARKS.
LOCK.
APPLICATION FILED JULY 22, 1911.

1,151,225.

Patented Aug. 24, 1915.
4 SHEETS—SHEET 1.

WITNESSES:
F. A. Carlson

INVENTOR.
William E. Sparks
BY
Beach & Furhn
ATTORNEYS.

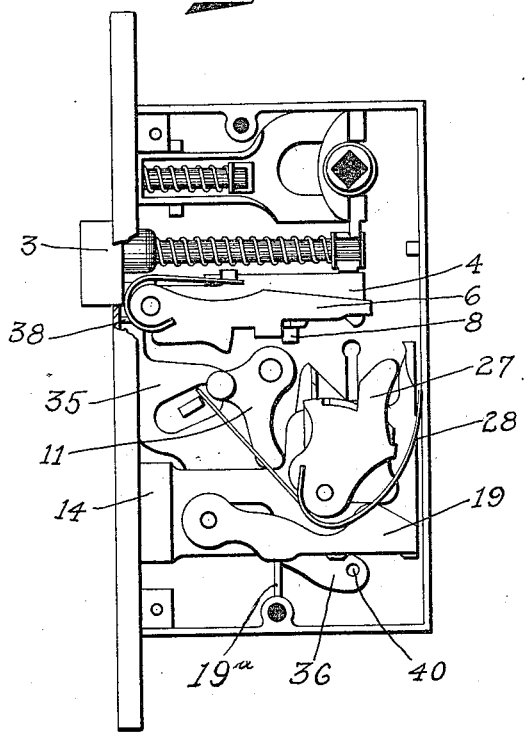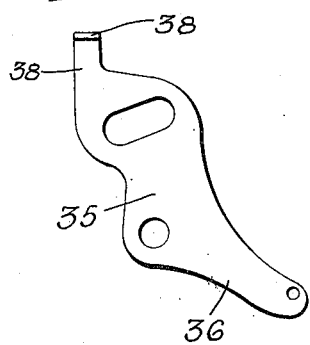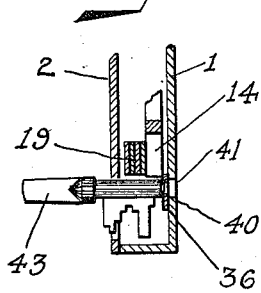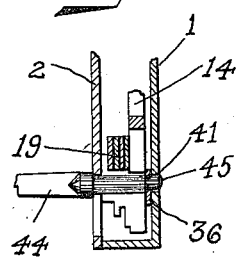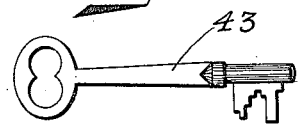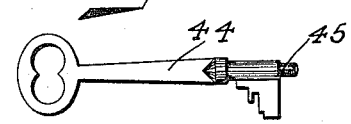

W. E. SPARKS.
LOCK.
APPLICATION FILED JULY 22, 1911.
1,151,225.
Patented Aug. 24, 1915.
4 SHEETS—SHEET 4.
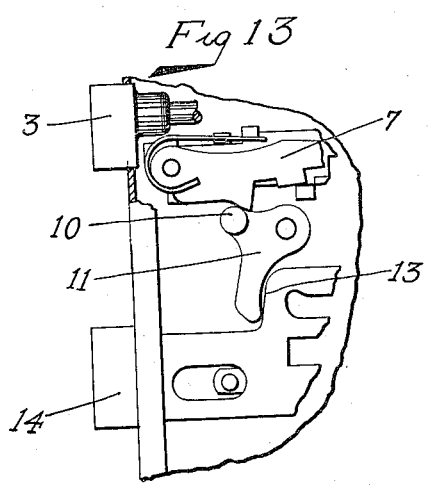
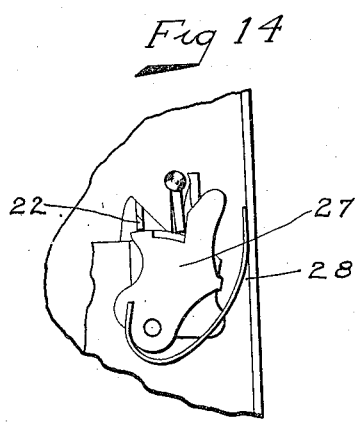
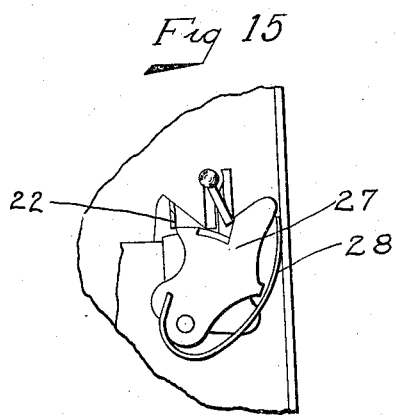
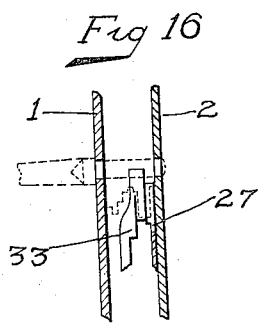
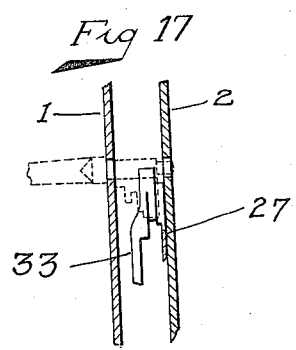
WITNESSES:
F. A. Carlson.
INVENTOR.
William E. Sparks
BY Beach & Fisher
ATTORNEYS.

UNITED STATES PATENT OFFICE.

WILLIAM E. SPARKS, OF NEW HAVEN, CONNECTICUT, ASSIGNOR TO SARGENT & COMPANY, OF NEW HAVEN, CONNECTICUT, A CORPORATION OF CONNECTICUT.

LOCK.

1,151,225.   Specification of Letters Patent.   Patented Aug. 24, 1915.

Application filed July 22, 1911. Serial No. 639,961.

*To all whom it may concern:*

Be it known that I, WILLIAM E. SPARKS, of the city and county of New Haven and State of Connecticut, have invented new and useful Improvements in Locks, of which the following is a full, clear, and exact description when taken in connection with the accompanying drawings, which form a part thereof.
My invention relates to locks, and its objects are to provide a device adapted to prevent the operative insertion of a key or keys into a keyhole, while permitting the operative insertion of another key into the same keyhole, and to provide such arrangement, particularly in connection with a bolt operated from the outer side of the door and a bolt operated from the inner side, the latter being operable to set the key stop member in blocking position; to provide in connection with dogging means for a latch bolt operable from one side of the door, means whereby the dogging mechanism is released when the dead bolt operable from the other side of the door is protracted, and whereby the protraction of the dogging means retracts the said dead bolt; to provide a bolt tumbler mechanism of a special construction; and to generally improve the construction of a lock of this type.

Figure 1:
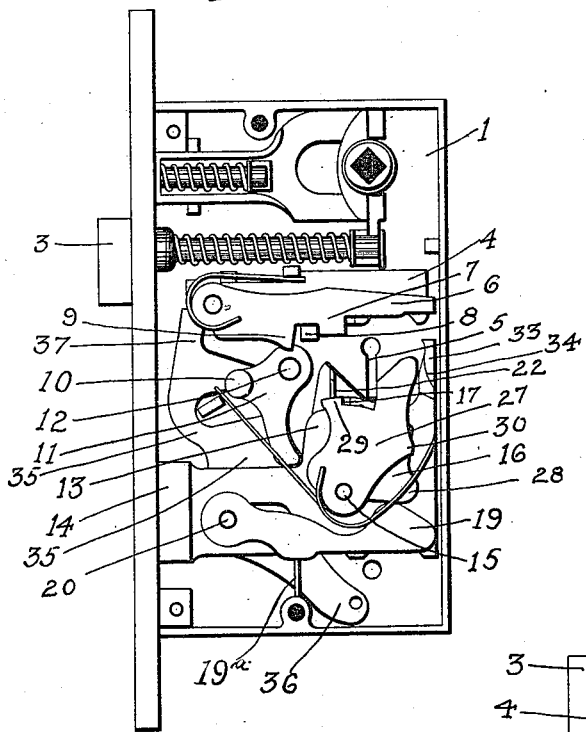
Figure 18:
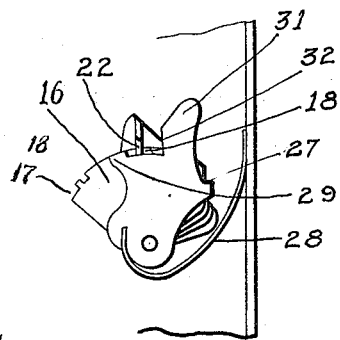
Figure 2:
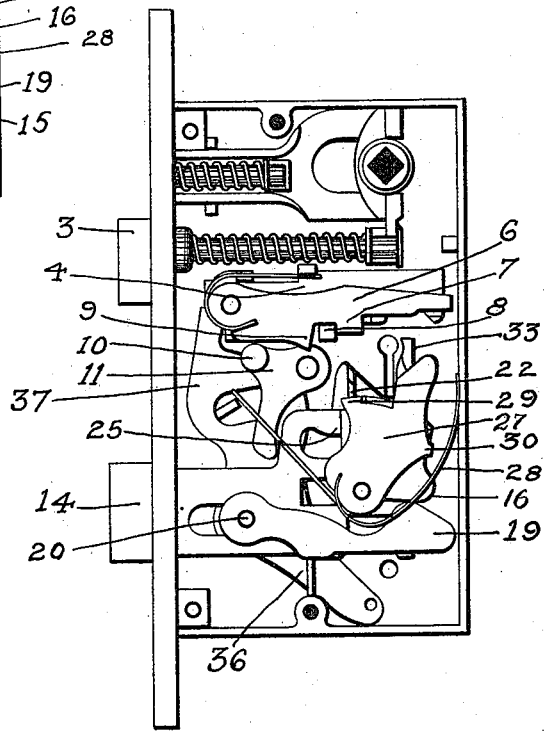
Figure 19:
Figure 4:
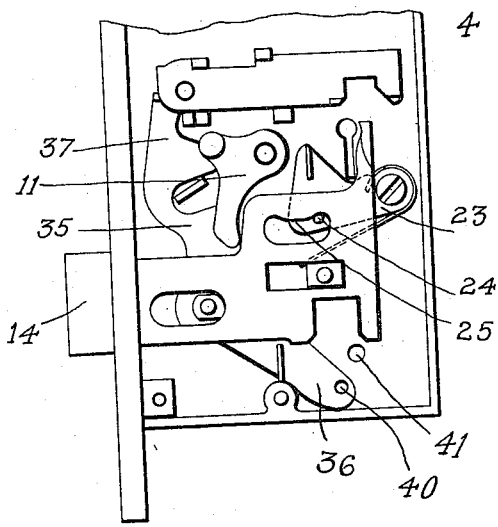
Figure 5:
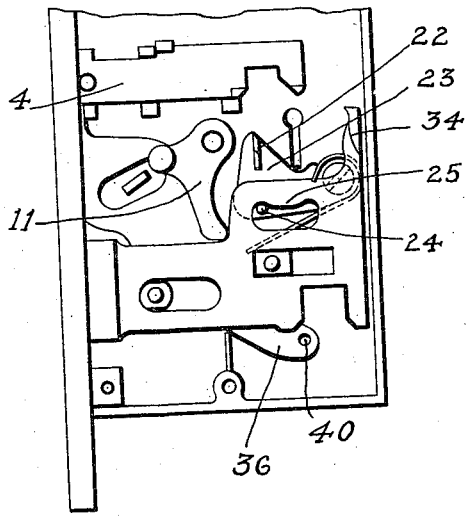
Figure 6:
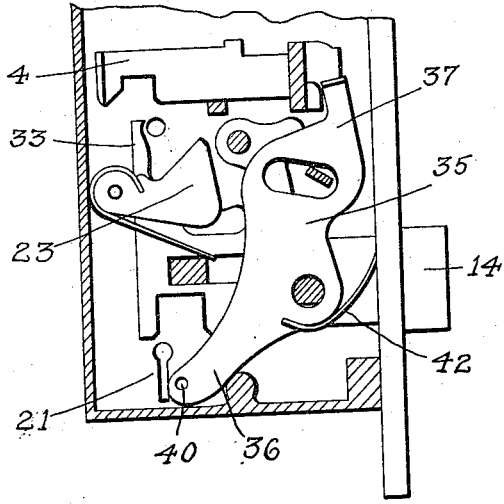
Figure 7:
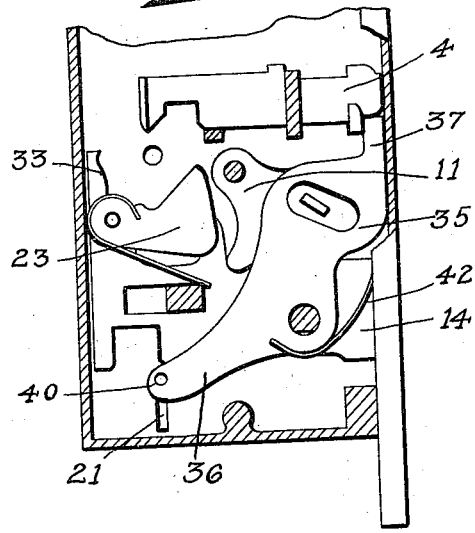

To these and other ends, my invention is embodied in preferable form in the device hereinafter described and illustrated in the accompanying drawings, in which—
Figure 1 is a side view with the cap plate removed, and the dead bolt and interior dogging bolt retracted; Fig. 2, a similar view with the dead bolt protracted; Fig. 3, a similar view with the interior bolt constituting the latch dogging means protracted and deadbolt retracted; Fig. 4, a detail view of lower part of lock showing deadbolt protracted and tumblers removed; Fig. 5, a similar view showing interior dogging bolt protracted and deadbolt retracted; Fig. 6, a rear view with dogging bolt partly retracted and key stop member partly withdrawn from blocking position; Fig. 7, a view similar to Fig. 6 with dogging bolt protracted and deadbolt retracted; Fig. 8, a detail section of the deadbolt and tumblers with change key in the keyhole; Fig. 9, a similar view with the emergency key in place; Fig. 10, a detail side view of the change or guest key employed in connection with this lock;
Fig. 11, a similar view of the master emergency key; Fig. 12, detail plan of key blocking member; Fig. 13, detail side view of latch bolt head, dogging bolt therefor, and tumbler releasing mechanism; Fig. 14, a detail plan of stop tumbler with key inserted from opposite side through upper keyhole; Fig. 15, a similar view showing the stop tumbler operated by the said key; Fig. 16, a cross section through upper keyhole showing same engaged by the change key; Fig. 17, a view similar to Fig. 16, showing the keyhole engaged by the emergency key; Fig. 18, a detail side view of tumblers showing the racking piece and stop tumbler in release position; Fig. 19, a cross section through the tumblers controlling the dead bolt.

Throughout the several views, like letters of reference denote the same parts.

Referring to the drawings, 1 is a casing and 2 the cap plate of a lock. Slidably mounted within the casing is a latch bolt 3 operated by a yoke, hub and knob construction of ordinary form. A sliding interior bolt 4 is mounted in the casing, and is adapted to constitute a dogging member to dog the latch bolt whereby the latter may serve as a locking bolt to prevent the opening of the door from the outside. To this end, the forward portion of the bolt 4 is adapted in protracted position to bear against the inner face of the head of the latch bolt. The dogging bolt 4 is operated from the exterior of the casing by a key insertible through a keyhole 5 formed in the casing, or by other instrumentality preferably from the inside of the door. The dogging bolt carries a spring pressed tumbler 6 having a projection 7 to engage a tumbler stump 8.

Projecting downwardly from the tumbler 6 is an inclined shoulder 9 with which is preferably associated a rounded cam pin 10 fixed on the end of one arm of a dogging-bolt releasing member consisting of a lever 11 pivoted on the fixed pin 12. The other arm of the lever extends into line with a shoulder 13 of a dead bolt 14, and the lever is operated by the dead bolt upon the protracted movement of the latter. The action of the lever 11 when operated by the contact of the dead bolt therewith is to force the tumbler 6 upwardly so as to carry the lower edge of the projection 7 above the tumbler stump 8, and then in the continued movement of the lever to retract the bolt 4 and tumbler by the pressure of the cam pin against the inclined shoulder 9 until the projection is caught and held by the upper face of the tumbler stump, thereby holding the tumbler in such position that the dogging bolt may be readily pushed back to retracted position when the latch bolt itself is retracted by the knob or otherwise.

Pivoted on a pin 15 fixed to the casing are spring pressed tumblers 16, which are provided on their outer edges with notches 17 at the extreme forward ends of the tumblers, and with notches 18 between the ends. The tumblers 16 are operated by intermediate tumblers 19 pivoted on a pin 20 fixed to the casing, which tumblers 19 are actuated by the bit of a key adapted to be inserted through the keyhole 21 passing through the cap plate on the outer side of the lock. The tumblers 19 are supported from beneath in a predetermined position by means of a suitable projection 19ª within the case.

The notches 17 of the tumblers 16 stand normally in registry with the stop lug 22 of a spring pressed bolt locking and releasing member or racking piece 23, which has a pin 24 adapted to engage either end of a rounded shoulder 25 projecting into a slot 26 formed in the dead bolt, whereby when the lug 22 is free to move into the notches of the tumbler 16 the dead bolt may be protracted or retracted, but when said stop lug is prevented from moving into the notches the pin 24 is held rigidly against one end of the shoulder 25 so as to prevent the sliding movement of the dead bolt.

Mounted upon the pin 15 and bearing upon the tumblers 16 is a stop tumbler 27 having a spring 28 which bears against the side wall of the casing and is adapted to hold a lug 29 normally in registry with the stop lug 22 of the racking piece 23 in order to prevent the rocking movement of the racking piece 23 except when the stop tumbler 27 is moved sufficiently to carry the lug 29 out of line with the lug 22. The stop tumbler 27 is provided with an inwardly projecting lug 30 which engages the edges of the tumblers 16 and serves to limit the spring pressed movement of the stop tumbler so as to hold it in proper position relative to the stop lug of the locking tumbler.

Between the lug 29 and inner edge of an upwardly extending elongated tongue 31 is formed a notch 32 which permits the stop lug 22 to enter the notches 18 in the tumbler 16 when said tumblers and the tumbler 27 are moved pivotally by the contact of the controlling tumblers 19 and the pressure of the spring 28, respectively. The tongue 31 of the stop tumbler extends upwardly adjacent to the keyhole 5 into the path of the bit of a key that may be inserted through the keyhole from the inner side of the door, whereby said stop tumbler may be rocked from its stop position by the rotation of the inside key to permit the retraction of the dead bolt by the further rotation of said key. To effect this retraction of the dead bolt from the inside, said dead bolt is provided with an upwardly extending talon 33 movable into and out of the path of the bit of the inside key, and provided with a raised rounded shoulder 34 to engage the bit of the key, whereby when the dead bolt is in protracted position and the door is locked from the inside by the deadlocking of the latch bolt by a key the movement of the key in so locking the door will operate through the release of the stop tumbler and the engagement of the bit with said talon to retract the dead bolt.

Pivoted on the pin 20 is a key stop member consisting of a lever 35 having a lower arm 36 and an upper arm 37. The upper arm of the lever is provided with a lug 38 with which is adapted to contact the forward end of the dogging bolt 4, whereby in the protracted movement of said dogging bolt the lever is so rocked on its pivot as to carry the end of the lower arm of the lever upwardly and transversely into the path of entry or insertion of the key which directly operates the dead bolt. The stop lever preferably consists of a flat piece of metal, and it lies directly against and is rigidly supported by the rear wall of the casing. The end of the lower arm of the lever is provided with a hole 40 which is adapted to register with the hole 41 formed in the rear wall of the casing, and adapted to receive the stem of a key inserted into the lower keyhole. A spring 42 attached to the lever serves to normally hold the lower rocking arm of the lever out of line with the key stem aperture and to return the lever to such normal position when the dogging bolt 4 is retracted. The stop member will permit the insertion into the keyhole formed in the cap plate of the bit of any of the keys employed to operate the bolt, but is of sufficient thickness to so limit and shorten the insertion movement of a guest key or master key as to hold the bit of said key in alinement with the wall of the casing formed by the cap plate so that it is impossible to rotate the key. This construction affords a rigid support for the key blocking member and so will prevent the bending or breaking of the latter through the attempted insertion of an improper key, while the engagement of the bit with the wall formed by the cap plate prevents the turning of the bit, thus avoiding any danger of bending or mutilating any parts, such as movable wards, that might be employed to prevent the complete operative rotation of the key, but permit its partial rotation. It will be seen also that the stop member above described, particularly coöperates with the construction in which the bolt operated from the inside of the door and which controls the operation of said stop member is associated with the locking bolt in the casing below the said bolt operated from the inside.

In Fig. 10 is shown a change or guest key 43, the stem of which is of such diameter that the stem will enter the aperture 41 in the rear wall of the casing, thus permitting the projection of the bit of the key into operative position. The diameter of the ward aperture 40, however, being less than the diameter of the aperture 41, and also less than the diameter of the stem of the key 43 will block the complete insertion of said key, and thus throw the bit into engagement with the wall of the cap plate.

In Fig. 11, an emergency key 44 is shown of which the stem is provided with an elongated portion 45 of less diameter than that of the stem of the key 43 and which portion is capable of passing through the aperture 40 in the arm of the blocking lever so that the bit of said emergency key may pass beyond the cap plate and into operative position, whereby notwithstanding that the stop member may be in such position as to prevent the operative insertion of the key 43, the key 44 may still be inserted into such position and operated to protract and retract the dead bolt.

The operation of the lock is as follows: When the door has been closed from the inside of the room and it is desired to dead lock the latch bolt so that said latch bolt may serve as a locking bolt, the guest key 43 is inserted from the inside of the door into the keyhole 5 and the tumbler 6 released from its tumbler stump and the dogging bolt 4 protracted carrying its front end against the inner face of the head of the latch bolt, whereupon when the tumbler is released and engages the forward side of the tumbler stump the latch bolt will be deadlocked against rearward movement. The forward movement of the dogging bolt carries forward the upper end of the stop lever 35, which movement projects the lower arm of said stop lever transversely into the keyway of the lower keyhole with the hole 40 in registry with the hole 41 in the rear wall of the casing. In this position of the stop member it will be impossible for any one to insert completely any key except the key 45 into the lower keyhole, and therefore it will be impossible to unlock the door from the outside or protract the dead bolt into locking position except by said emergency key. Should it be found desirable to unlock the door from the outside after it has been locked from the inside this may be done by means of the emergency key, the stem of which will pass through the aperture 40 in the stop member and into the aperture 41 in the casing so that the bit of the key can be inserted into operative position and the key operatively rotated.

In unlocking the door after it has been locked on the inside as described, it is necessary that the bolt 14 be first protracted. In turning the key to effect such protraction the intermediate actuated tumblers 19 are rocked on their pivots so as to carry them against the tumblers 16 which tumblers are thereby turned until their notches 18 are carried into registry with the stop lug 22 of the racking piece 23. This movement of the tumbler 16 permits the stop tumbler 27 to be moved by its spring 28 sufficiently far to bring the notch 32 also into registry with the stop lug 22, and thereupon in the continued movement of the key the dead bolt may be protracted, the racking piece 23 being enabled to yieldingly move downward by the entrance of the stop lug 22 into the notches of the tumblers. In the protracted movement of the bolt its shoulder 13 will bear against the lower end of the lever 11 and the cam pin 10 of said lever will be forced against the inclined shoulder 9 of the tumbler 6, thus freeing said tumbler from engagement with the front face of the tumbler stump and forcing both the tumbler and the dogging bolt backwardly away from the head of the latch bolt and sufficiently far to enable the projection 7 to engage the upper edge of the tumbler stump. In this position of the tumbler 6, the dogging bolt will be released from dead locking position, and thereupon the latch bolt may be retracted by turning the knob. This retracting movement of the latch bolt carries the dogging bolt back until the projection 7 of the spring pressed tumbler 6 slips behind the tumbler stump, whereupon the dogging bolt will be locked in retracted position, and the latch will be free to operate. Thereupon the emergency key is rotated in the opposite direction operating the tumblers in the same manner as before described, and retracting the dead bolt, whereupon the door may be opened.

Should the dead bolt have been first protracted, the protraction of the dogging-bolt from the inside for the purpose of dead locking the latch bolt will serve to retract said deadbolt. This is effected by means of the operation of the bit of a key inserted from the inside, upon the tongue 31 of the stop tumbler 27, which serves to move said stop tumbler rearwardly out of alinement with the lug 22 of the racking piece 23, thereby permitting the lug 22 to enter the forward notches 17 of the tumblers 16 when the dead bolt is retracted, and in the continued movement of the key the complete retraction of the dead bolt is effected by the engagement of the bit with the vertically prolonged talon arm 33. On further rotation of the key the bolt 4 is moved forward into deadlocking position in respect to the latch bolt, as above explained.

It will be understood that when the bolt 14 is actuated by a key from the outside, the tumblers 19 and the stop tumbler 27 are moved together in one direction to release the bolt from the locking member or racking piece 23, whereas when said bolt is to be retracted by a key inserted from the inside of the door, the release of the bolt is effected by the individual movement of the stop tumbler 27 in an opposite direction.

The means for actuating one of the bolts (14) from opposite sides of the door by different actuations respectively of the tumbler mechanism for said bolt is an important feature of the invention. To actuate the bolt from the outside of the door requires a shifting movement of a plurality of tumblers, and this is obviously desirable to make the lock safe and secure from attack from the outside, and yet the bolt may be actuated from the inside in a much simpler manner, i. e., by the actuation of a less number of tumblers, because there is little likelihood that the lock will be picked, or otherwise attacked, from the inside. The security of the lock is very much increased by using a key with an unsymmetrical bit, as shown, which is adapted to actuate a relatively large number of tumblers, when inserted from the outside of the door, but which, nevertheless, in spite of its unsymmetrical form, is adapted to release the tumbler mechanism equally well when the key is inserted from the inside of the door.

Having now described my invention, what I claim and desire to secure by Letters Patent, is:—

1. In a lock, the combination with a bolt, of a plurality of keys for operating the same, a casing having a common keyhole for said keys, a movable key stop member operable when in stop position to prevent the operation of one key in said keyhole and to permit the operation of another key therein, and a key operated member movable relatively to said stop member and bolt and operable to hold said stop member in stopping position; substantially as described.

2. In a lock, the combination with a plurality of keys, a bolt operable by said keys, a casing having a keyhole common to said keys, a movable key operated member above said bolt, and a key stop member for said keyhole movable relatively to said upper member and operated thereby and operable when in stop position to prevent the operation of the bolt by one key while permitting such operation by another key; substantially as described.

3. In a lock, the combination with a casing having a keyhole through one wall to receive the key bit and having a key stem hole in the opposite wall, a blocking device lying against said latter wall and operable by means exterior of the casing; substantially as described.

4. In a lock, the combination with a casing having a keyhole through one wall thereof, and having a key obstructing device lying against an opposite wall of the casing and movable transversely of the keyway, a key having a bit held from operative rotation by said device, another key having a bit formed to rotatably operate when said device is in obstructing position, and means to operate said device from the exterior of the casing; substantially as described.

5. In a lock, the combination with a casing having a keyhole through one wall thereof, and having a key obstructing device lying against an opposite wall, a key having a bit held by said device in engagement with the keyhole wall, another key having a bit formed to pass said keyhole wall when said device is in obstructing position, and means to operate said device from the exterior of the casing; substantially as described.

6. In a lock, the combination with a casing having opposite walls and having a keyhole in its outer wall, of a key having a bit rotatably operable between said walls, a key blocking device lying against the inner wall and movable transversely of the keyway to throw said bit into engagement with the outer wall to prevent the rotation of said key, and another key having a bit formed to pass said wall when said device is in blocking position, and means to operate said device; substantially as described.

7. In a lock, the combination with a casing having a keyhole through one wall thereof, and having a key stem hole in the other wall thereof, a key blocking device intermediate said holes and having a hole adapted to register with the key stem hole and of such diameter as to prevent the insertion therein of the stem of one key and to permit the insertion therein of the stem of another key; substantially as described.

8. In a lock, the combination with a casing having a key stem hole, a blocking device operable to lessen the entrance area if said hole, a plurality of keys one of said keys having a stem of less diameter than the other to permit it to enter the casing hole when the said device is in blocking position; substantially as described.

9. In a lock, the combination with a latch bolt, of deadlocking means therefor movable to protracted position by a key, a deadbolt, and means to release said deadlocking means, by the protraction of said deadbolt; substantially as described.

10. In a lock, the combination with a latch bolt, of a dogging member therefor, means to lock said member in dogging position, a deadbolt, and means to release said dogging member from its locking means when the deadbolt is protracted; substantially as described.

11. In a lock, the combination with a latch bolt, of a dogging bolt therefor, a locking tumbler for said dogging bolt, a deadbolt, and a pivoted member operable upon the protraction of the deadbolt to move the tumbler to released position; substantially as described.

12. In a lock, the combination with a plurality of bolts, a locking tumbler for one bolt, and a pivoted member operable by the other bolt in its protracted movement to release said tumbler; substantially as described.

13. In a lock, the combination with a plurality of bolts, of a latch bolt, a hub, separate independently operable tumblers for said bolts, means for operating one of said bolts directly from the inside only of the door, and means for deadlocking said hub by the protraction of said inside bolt; substantially as described.

14. In a lock, the combination with a plurality of bolts, of means for operating directly one of said bolts from the inside of the lock only, separate independently operable tumbler mechanism of each bolt, and a latch bolt deadlocked by said inside bolt when the latter is protracted; substantially as described.

15. In a lock, the combination with a plurality of bolts, of a plurality of keyways, a tumbler engaging one of said bolts, a stop tumbler normally positioned to prevent the release of said bolt engaging tumbler, a key operable through one keyway to release said stop tumbler and protract or retract the bolt engaged by the other tumbler, and a key operable through the other way to release said stop tumbler and retract said bolt; substantially as described.

16. In a lock, the combination with a plurality of bolts, of a plurality of keyways, and a stop member mounted independently of said bolts but operable by one of them to obstruct one of the keyways; substantially as described.

17. In a lock, a dead bolt, a movable ward associated with the keyhole thereof, a latch bolt, and a deadlocking device for said latch bolt which shifts said ward into operative position; substantially as described.

18. In a lock, a case having a keyhole, a dead bolt in said case operable by way of said keyhole, a movable ward associated with said keyhole, means normally holding said ward in its non-locking position, a latch bolt, and a latch bolt deadlocking member which moves said ward into blocking position as the latch bolt is deadlocked; substantially as described.

19. In a lock, the combination of a case, a slide therein movable from the inside of the door, a slide movable from the outside of the door, and means for releasing the first named slide for retraction, without retracting it, automatically as the second slide is protracted; substantially as described.

20. In a lock, the combination of two bolts, tumbler mechanism for each bolt, and a pivoted lever operable by one of the bolts to release the tumbler mechanism of the other bolt; substantially as described.

21. In a lock, the combination of an inside bolt, an outside bolt, tumbler mechanism for each of said bolts, and a pivoted lever operable by the outside bolt as the latter is protracted to release the tumbler mechanism of the inside bolt; substantially as described.

22. In a lock, the combination of two independent sliding members capable of occupying their protracted positions at the same time, tumbler mechanisms for the respective members, and means intermediate said members for releasing one of said tumbler mechanisms as the other member is protracted; substantially as described.

23. In a lock, the combination of two independent sliding members capable of occupying their protracted positions at the same time, tumbler mechanisms for said members, means for releasing the tumbler mechanism of one of said members as the other member is protracted, and means for retracting the member having the released tumbler mechanism; substantially as described.

24. In a lock, a case, two sliding members therein, a keyhole at the outside of the case for the insertion of a key, said key when so inserted adapted to move one of said members in either direction, and a keyhole at the inside of the case for the insertion of a key to move the other sliding member in either direction, said first member being movable rearwardly by a key inserted in said inside keyhole; substantially as described.

25. In a lock, a dead bolt, a latch bolt, and means to simultaneously deadlock the latch bolt and retract the dead bolt; substantially as described.

26. In a lock, a dead bolt, a latch bolt, and means actuated from the inside of the door to simultaneously deadlock the latch bolt and retract the dead bolt; substantially as described.

27. In a lock, a dead bolt, a latch bolt, and key operated means actuated from the inside of the door to simultaneously deadlock the latch bolt and retract the dead bolt; substantially as described.

28. In a lock, a case, a dead bolt in said case protractable from one side only, a latch bolt in said case, and a deadlocking device for said latch bolt protractable only from that side of the case opposite that from which the dead bolt is protracted; substantially as described.

29. In a lock, a case, a dead bolt therein protractable from one side only, a latch bolt, and a latch bolt deadlocking device protractable only from the side of the case opposite that from which the dead bolt is protracted, said dead bolt when protracted being retracted simultaneously with the protraction of said deadlocking device; substantially as described.

30. In a lock, a latch bolt, a deadlocking device therefor, a dead bolt, and means for moving said deadlocking device into operative position as said dead bolt is retracted; substantially as described.

31. In a lock, a latch bolt, a deadlocking device therefor, means to move said deadlocking device into deadlocking position, and a dead bolt retractable independently, or retractable by said last named means, simultaneously with the deadlocking of the latch bolt; substantially as described.

32. In a lock, a latch bolt, a deadlocking device therefor movable by a key into operative position from the inside of the door, and a dead bolt protractable and retractable independently from the outside of the door, or retractable by the aforesaid key as the latter moves said deadlocking device to operative position; substantially as described.

33. In a lock, a latch bolt, means for retracting the same manually from the outside of the door, a dead bolt, dogging means for said retracting means operable from the inside of the door, means for locking said dogging means in inoperative position, and means for automatically releasing said locking means upon the protraction of said dead bolt; substantially as described.

34. In a lock, a latch bolt, an outside key bolt retractable from the inside of the door, and an inside key bolt protractable into deadlocking position with respect to the latch bolt simultaneously with the rectraction of said first key bolt from the inside of the door; substantially as described.

35. In a lock, a dead bolt, a case therefor, keyholes at opposite sides of the case, out of alinement with each other, and a series of tumblers for said bolt having two different positions in which the bolt is released by keys inserted in the respective keyholes; substantially as described.

36. In a lock, a case, a bolt therein, and a series of pivoted tumblers for said bolt having one position for releasing the bolt from one side of the door, and another position for releasing the bolt from the opposite side of the door; substantially as described.

37. In a lock, the combination of a case, a dead bolt therein, a plurality of tumblers for said bolt, means for operating said bolt from one side of the case by the actuation of all of said tumblers, and means for operating said bolt from the opposite side of the case by the actuation of less than the full number of tumblers; substantially as described.

38. In a lock, the combination of a case, a dead bolt therein, a series of tumblers for said bolt, a key insertible into the case from one side and operable to throw said bolt by the joint actuation of said tumblers, and means to actuate said bolt from the other side of the case by the individual actuation of one of said tumblers; substantially as described.

39. In a lock, the combination of a case, a dead bolt therein, a series of tumblers for said bolt, a key insertible into the case from the outside to throw said bolt by the joint actuation of said tumblers, and means to retract the bolt from the inside of the door by the individual actuation of one of said tumblers; substantially as described.

40. In a lock, the combination of a case, a dead bolt therein, a series of pivoted tumblers for said bolt, key mechanism at one side of the door to throw said bolt by a joint actuation of said tumblers, and means operable from the opposite side of the door to engage one of said tumblers individually and actuate the bolt without operating the other tumblers; substantially as described.

41. In a lock, a dead bolt, a plurality of tumblers therefor, means at one side of the door to protract said bolt by the actuation of a plurality of tumblers, and means at the opposite side of the door to retract the bolt by the actuation of a less number of tumblers; substantially as described.

42. In a lock, a dead bolt, a plurality of pivoted tumblers therefor, means at one side of the door to protract said bolt by the joint actuation of all of said tumblers, and means at the other side of the door to retract the bolt by the individual actuation of one of said tumblers; substantially as described.

43. In a lock, the combination of a bolt, a plurality of tumblers therefor, a key having an unsymmetrical bit adapted to release the bolt by actuating a plurality of such tumblers, when the key is inserted from one side of the door, and means whereby said bit is adapted to release the bolt by the actuation of a less number of tumblers when the key is inserted from the opposite side of the door; substantially as described.

44. In a lock, the combination of a bolt, and tumbler mechanism therefor, including a stop tumbler movable in one direction to release the bolt from one side of the door, and movable in the other direction to release the bolt from the opposite side of the door; substantially as described.

45. In a lock, the combination of a bolt, a plurality of tumblers therefor, including a stop tumbler movable in either of two directions to release the bolt, a key for protracting the bolt from one side of the door by moving said stop tumbler with the other tumblers in one direction, and means to actuate said bolt from the opposite side of the door by shifting the stop tumbler individually in the opposite direction; substantially as described.

46. In a lock, a case, a dead bolt therein, keyholes at opposite sides of the case, and tumblers for said dead bolt having separate releasing positions corresponding to the respective keyholes; substantially as described.

47. In a lock, a case having a keyhole, a dead bolt in said case, a plurality of tumblers for said dead bolt movable to a predetermined releasing position by a key inserted in said keyhole, said tumblers normally lying in another releasing position, a member in the case to prevent normally the release of the bolt with said tumblers in said second releasing position, and means to shift said member to release the bolt; substantially as described.

48. In a lock, a case having a keyhole at one side, a dead bolt in said case, a plurality of tumblers for said dead bolt movable to a predetermined releasing position by a key inserted in said keyhole, said tumblers normally lying in another releasing position, a member in the case to prevent normally the release of the bolt with said tumblers in said second releasing position, and means operable from the exterior of the case at the side opposite said keyhole to shift said release preventing means to an inoperative position; substantially as described.

49. In a lock, a case having a keyhole at the outside, a dead bolt in said case, a pivoted tumbler for said bolt movable to a predetermined releasing position by a key inserted in said keyhole, said tumbler normally lying in another releasing position, a stop tumbler in the case to prevent normally the release of the bolt with said first tumbler in said second releasing position, and means operable from the inside of the door to shift said stop tumbler to an inoperative position; substantially as described.

50. In a lock, a case having a keyhole at the outside, a dead bolt in said case, a tumbler for said bolt movable to a predetermined releasing position by a key inserted in said keyhole, said tumbler normally lying in another releasing position, a stop tumbler to prevent normally the release of the bolt, with said first tumbler in said second releasing position, and means operative from the inside of the door to shift said stop tumbler to an inoperative position and retract the bolt; substantially as described.

51. In a lock, a case, a bolt in said case, a keyhole at one side of the door, a single group of tumblers for said bolt, a key insertable into said keyhole to release and actuate said bolt with said tumblers in a predetermined releasing position, and means operable from the opposite side of the door at a point out of alinement with said keyhole to release and operate said bolt with said tumblers in another releasing position; substantially as described.

52. In a lock, a case, a bolt in said case, a keyhole at the outside of the door, a plurality of tumblers for said bolt, a key insertible into said keyhole to actuate said bolt and having a bit adapted to move said tumblers into a predetermined releasing position, and means operable from the inside of the door at a point out of alinement with said keyhole to release and operate said bolt with said tumblers in another releasing position; substantially as described.

53. In a lock, a case, a bolt in said case, a keyhole at one side of the door, a plurality of tumblers for said bolt, a key insertible in said keyhole to actuate said bolt and adapted to move a number of said tumblers into a predetermined releasing position, and means operable from the opposite side of the door to release and operate said bolt by the actuation of a less number of tumblers; substantially as described.

54. In a lock, a case, a bolt in said case, a keyhole at the outside of the door, a single group of tumblers for said bolt, a key insertible into said keyhole to actuate said bolt and adapted to move a number of said tumblers into a predetermined releasing position, and means operable from the inside of the door at a point out of alinement with said keyhole to release and operate said bolt by a different actuation of said tumblers; substantially as described.

55. In a lock, the combination of a case having a keyhole at the outside of the door, a bolt operative by a key inserted into said keyhole, a bolt operative from the inside of the door, a ward member movable relative to both bolts and associated with the outside keyhole, and means for moving said ward member into key blocking position with reference to said keyhole when the second bolt is protracted; substantially as described.

56. In a lock, the combination of a case having a keyhole at the outside of the door, a plurality of different keys insertible into said keyhole, a dead bolt in said case operable by all of said keys, a second bolt in said case, means operable from the inside of the door to protract said second bolt, a ward associated with said keyhole, and means for moving said ward into blocking position with respect to one or more of said keys automatically on the actuation of the means for operating said second bolt; substantially as described.

57. In a lock, the combination of a case having a keyhole at the outside of the door, an outside bolt operable by a plurality of keys insertible into said keyhole, a second bolt, operable from the inside of the door, and a pivoted ward member movable relative to both bolts, and arranged to be automatically shifted into coöperation with the outside keyhole when the second bolt is protracted; substantially as described.

In witness whereof, I have hereunto set my hand on the 20th day of July, 1911.

WILLIAM E. SPARKS.

Witnesses:
  JOHN H. SHAW,
  BERTHA RAY.

Copies of this patent may be obtained for five cents each, by addressing the "Commissioner of Patents, Washington, D. C."